US011335507B2

(12) United States Patent
Mizuno

(10) Patent No.: US 11,335,507 B2
(45) Date of Patent: May 17, 2022

(54) MULTI-LAYER CERAMIC CAPACITOR AND METHOD OF PRODUCING THE SAME

(71) Applicant: Taiyo Yuden Co., Ltd., Tokyo (JP)

(72) Inventor: Kotaro Mizuno, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

(21) Appl. No.: 16/705,793

(22) Filed: Dec. 6, 2019

(65) Prior Publication Data

US 2020/0111617 A1 Apr. 9, 2020

Related U.S. Application Data

(60) Continuation of application No. 16/426,874, filed on May 30, 2019, now Pat. No. 10,535,470, which is a
(Continued)

(30) Foreign Application Priority Data

Aug. 30, 2016 (JP) .................................. 2016-168334

(51) Int. Cl.
*H01G 4/008* (2006.01)
*H01G 4/12* (2006.01)
(Continued)

(52) U.S. Cl.
CPC .............. *H01G 4/30* (2013.01); *H01G 4/008* (2013.01); *H01G 4/0085* (2013.01); *H01G 4/12* (2013.01);
(Continued)

(58) Field of Classification Search
CPC ...... H01G 4/002; H01G 4/008; H01G 4/0085; H01G 4/12; H01G 4/1227; H01G 4/224;
(Continued)

(56) References Cited

U.S. PATENT DOCUMENTS

2008/0304204 A1 12/2008 Suzuki
2011/0157768 A1 6/2011 Hur et al.
(Continued)

FOREIGN PATENT DOCUMENTS

CN 103884176 A * 6/2014 ............... F27B 5/04
CN 103971932 A 8/2014
(Continued)

OTHER PUBLICATIONS

Office Action dated Nov. 20, 2018 in Japanese Application No. 2016-168334, along with its English translation.
(Continued)

*Primary Examiner* — Timothy J Thompson
*Assistant Examiner* — Guillermo J Egoavil
(74) *Attorney, Agent, or Firm* — Saliwanchik, Lloyd & Eisenschenk

(57) ABSTRACT

A multi-layer ceramic capacitor includes a multi-layer unit and a side margin. The multi-layer unit includes a capacitance forming unit and a cover. The capacitance forming unit includes ceramic layers laminated in a first direction and internal electrodes disposed between the ceramic layers and mainly containing nickel. The cover covers the capacitance forming unit from the first direction. The side margin covers the multi-layer unit from a second direction orthogonal to the first direction. The internal electrodes each include an oxidized area adjacent to the side margin and intensively including a metal element that forms an oxide together with nickel. The capacitance forming unit includes a first portion adjacent to the cover and a second portion adjacent to the first portion in the first direction and including the oxidized area having a smaller dimension in the second direction than that of the oxidized area of the first portion.

7 Claims, 11 Drawing Sheets

Related U.S. Application Data division of application No. 15/678,655, filed on Aug. 16, 2017, now Pat. No. 10,373,761.

(51) Int. Cl.
  *H01G 4/224* (2006.01)
  *H01G 4/30* (2006.01)
  *H01G 4/232* (2006.01)
  *H01G 4/012* (2006.01)
  *H01G 4/248* (2006.01)

(52) U.S. Cl.
  CPC .......... *H01G 4/1227* (2013.01); *H01G 4/224* (2013.01); *H01G 4/012* (2013.01); *H01G 4/232* (2013.01); *H01G 4/248* (2013.01)

(58) Field of Classification Search
  CPC .......... H01G 4/30; H01G 4/012; H01G 4/232; H01G 4/248
  USPC ...... 361/301.4, 321.3, 321.5, 321.4; 174/260
  See application file for complete search history.

(56) References Cited

U.S. PATENT DOCUMENTS

| | | | |
|---|---|---|---|
| 2012/0147516 A1* | 6/2012 | Kim | H01G 4/30 361/301.4 |
| 2014/0211369 A1* | 7/2014 | Sasabayashi | H01G 4/30 361/301.4 |
| 2014/0285947 A1* | 9/2014 | Suga | H01G 4/30 361/301.4 |
| 2014/0301014 A1 | 10/2014 | Kim | |
| 2016/0293331 A1 | 10/2016 | Kitamura et al. | |

FOREIGN PATENT DOCUMENTS

| | | | | |
|---|---|---|---|---|
| CN | 104103422 A | | 10/2014 | |
| JP | 2006-135138 A | | 5/2006 | |
| JP | 2009-016796 A | | 1/2009 | |
| JP | 2009016796 A | * | 1/2009 | |
| JP | 2010-50263 A | | 3/2010 | |
| JP | 2010050263 A | * | 3/2010 | ............... H01G 4/12 |
| JP | 2012-124458 A | | 6/2012 | |
| JP | 2014-146669 A | | 8/2014 | |
| JP | 2014-204113 A | | 10/2014 | |
| KR | 10-1141457 B1 | | 5/2012 | |
| KR | 10-2016-0025541 A | | 3/2016 | |

OTHER PUBLICATIONS

Office Action dated Sep. 14, 2018 in U.S. Appl. No. 15/678,655.
Notice of Allowance dated Mar. 25, 2019 in U.S. Appl. No. 15/678,655.
Notice of Allowance dated Sep. 6, 2019 in U.S. Appl. No. 16/426,874.
Office Action dated Aug. 4, 2020 in Chinese Application No. 201710767431.4, along with its English translation.
Office Action dated Jul. 21, 2020 in Japanese Application No. 2019-099212, along with its English translation.
Office Action dated Jan. 29, 2021 in Japanese Application No. 2019-099212, along with its machine translation.
Office Action dated Jun. 11, 2021 in Japanese Application No. 2019-099212, along with its English translation.
Office Action dated Oct. 7, 2021 in Korean Application No. 10-2017-0104632.

* cited by examiner

MULTI-LAYER CERAMIC CAPACITOR AND METHOD OF PRODUCING THE SAME

CROSS-REFERENCE TO RELATED APPLICATIONS

This application is a continuation of U.S. application Ser. No. 16/426,874, filed May 30, 2019; which is a divisional of U.S. application Ser. No. 15/678,655, filed Aug. 16, 2017, now U.S. Pat. No. 10,373,761, issued Aug. 6, 2019; which claims priority and benefit of Japanese Patent Application No. 2016-168334, filed Aug. 30, 2016, all of which are hereby incorporated by reference in their entirety.

BACKGROUND

The present invention relates to a multi-layer ceramic capacitor including side margins provided in a subsequent step, and to a method of producing the multi-layer ceramic capacitor.

Along with miniaturization and achievement of high performance of electronic devices, there have recently been increasingly strong demands for increase in capacitance and the like with respect to multi-layer ceramic capacitors used in the electronic devices. In order to meet those demands, for example, it is effective to enlarge an intersectional area of internal electrodes of the multi-layer ceramic capacitor as much as possible.

In order to enlarge the intersectional area of the internal electrodes, the following technique is effective: side margins for ensuring insulation properties of the periphery of the internal electrodes are provided to a multi-layer chip in a subsequent step, the internal electrodes being exposed to the side surfaces of the multi-layer chip. This technique makes it possible to form thin side margins and relatively increase the intersectional area of the internal electrodes.

Meanwhile, in the multi-layer ceramic capacitor that is provided with the side margins in a subsequent step on the side surfaces of the multi-layer chip, foreign substances derived from the internal electrodes and the like may adhere to the side surfaces of the multi-layer chip in the production process. For those reasons, the internal electrodes may be electrically conducted to each other and a short circuit failure between the internal electrodes may occur in the side surfaces of the multi-layer chip.

To cope with this drawback, for example, as in the invention disclosed in Japanese Patent Application Laid-open No. 2009-016796, oxidized areas having low electrical conductivity can be formed at the ends of internal electrodes to inhibit a short circuit failure between the internal electrodes in the side surfaces of a multi-layer chip.

SUMMARY

In the multi-layer ceramic capacitor, although not limited to the case where the side margins are provided to the side surfaces of the multi-layer chip in a subsequent step, the internal electrodes may be deformed due to non-uniform shrinkage behaviors or the like at the time of sintering. The deformation of the internal electrodes is prone to occur at the ends of the internal electrodes. Such deformation of the internal electrodes may cause the ends of the adjacent internal electrodes to come into contact with each other.

In this case, as in the invention disclosed in Japanese Patent Application Laid-open No. 2009-016796, if the oxidized areas are formed at the ends of the internal electrodes to inhibit a short circuit failure between the internal electrodes, it is necessary to ensure large oxidized areas at the ends of the internal electrodes. This reduces an area that contributes to formation of a capacitance in each of the internal electrodes and thus reduces a capacitance of the multi-layer ceramic capacitor.

In view of the circumstances as described above, it is desirable to provide a multi-layer ceramic capacitor and a method of producing the same, which are capable of satisfying both of suppression of a short circuit failure and ensuring of a capacitance.

According to an embodiment of the present invention, there is provided a multi-layer ceramic capacitor including a multi-layer unit and a side margin.

The multi-layer unit includes a capacitance forming unit and a cover. The capacitance forming unit includes ceramic layers laminated in a first direction and internal electrodes disposed between the ceramic layers and mainly containing nickel. The cover covers the capacitance forming unit from the first direction.

The side margin covers the multi-layer unit from a second direction orthogonal to the first direction.

The internal electrodes each include an oxidized area, the oxidized area being adjacent to the side margin and intensively including a metal element that forms an oxide together with nickel.

The capacitance forming unit includes a first portion and a second portion, the first portion being adjacent to the cover, and the second portion being adjacent to the first portion in the first direction. The second portion includes an oxidized area (E2) having a smaller dimension (D2) in the second direction than a dimension (D1) of the oxidized area (E1) of the first portion in the second direction (D1, D2, E1, and E2 are described in more detail herein with reference to FIG. 4).

The internal electrodes in the configuration described above each include an oxidized area adjacent to the side margin. With this configuration, electrical conduction between the internal electrodes via foreign substances and the like on the side surface of the multi-layer unit is suppressed. Thus, a short circuit failure between the internal electrodes is suppressed.

Further, in the above configuration, the oxidized areas are large in the first portion in which the internal electrodes are easily deformed, and the oxidized areas are small in the second portion in which the internal electrodes are not easily deformed. With this configuration, in the first portion, electrical conduction between the internal electrodes by contact between the adjacent internal electrodes is efficiently suppressed. Therefore, a short circuit failure of the multi-layer ceramic capacitor is suppressed.

Meanwhile, the oxidized areas are small in the second portion, and thus a capacitance loss of the second portion is suppressed. With this configuration, the multi-layer ceramic capacitor can also ensure the capacitance.

The metal element may include at least one of magnesium and manganese.

According to another embodiment of the present invention, there is provided a method of producing a multi-layer ceramic capacitor, the method including: producing an unsintered multi-layer chip including a capacitance forming unit, a cover, and a side surface, the capacitance forming unit including ceramic layers laminated in a first direction and internal electrodes disposed between the ceramic layers and mainly containing nickel, the cover covering the capacitance forming unit from the first direction and having a thickness of 15 μm or less in the first direction, the side surface being oriented in a second direction orthogonal to the first direction, the internal electrodes being exposed to the side surface; producing an unsintered body by covering the side surface from the second direction by a side margin, the side margin containing a metal element that forms an oxide together with nickel and having a thickness of 15 μm or less in the second direction, the metal element having a concentration lower than a concentration of a metal element of the cover; and sintering the unsintered body.

In this configuration, the thickness of the cover in the first direction is 15 μm or less, and the thickness of the side margin in the second direction is 15 μm or less.

Further, the metal element that forms an oxide together with nickel of the cover has a concentration higher than the concentration of the metal element of the side margin.

With this configuration, at the time of sintering the unsintered body, a larger amount of the metal element that forms an oxide together with nickel and a larger amount of oxygen are supplied to the ends of the internal electrodes located near the ridge of the capacitance forming unit than those supplied to the ends of the other internal electrodes.

Therefore, since a larger amount of a composite oxide containing the metal element is formed at the ends of the internal electrodes located near the ridge of the capacitance forming unit than that formed at the ends of the other internal electrodes, the large oxidized area is formed. Thus, electrical conduction between the internal electrodes by contact between the ends of the adjacent internal electrodes is efficiently suppressed near the ridge of the sintered capacitance forming unit. Therefore, a short circuit failure of the multi-layer ceramic capacitor is suppressed.

Meanwhile, at the time of sintering the unsintered body, a larger amount the metal element is supplied to the ends of the internal electrodes located near the ridge of the capacitance forming unit than that supplied to the ends of the other internal electrodes. Thus, the amount of supply of the metal element is relatively small at the ends of the internal electrodes located near the center of the capacitance forming unit.

As a result, small oxidized areas are formed at the ends of the internal electrodes located near the center of the capacitance forming unit, and thus the capacitance loss near the center of the capacitance forming unit is suppressed. Therefore, the multi-layer ceramic capacitor can also ensure the capacitance.

The unsintered body may be sintered to from an oxidized area in each of the internal electrodes, the oxidized area being adjacent to the side margin and intensively including the metal element.

The capacitance forming unit may include a first portion and a second portion, and the first portion adjacent to the cover may include the oxidized area having a larger dimension in the second direction than a dimension of the oxidized area of the second portion adjacent to the first portion in the first direction.

The metal element may include at least one of magnesium and manganese.

It is possible to provide a multi-layer ceramic capacitor and a method of producing the same, which are capable of satisfying both of suppression of a short circuit failure and ensuring of a capacitance.

These and other objects, features and advantages of the present invention will become more apparent in light of the following detailed description of embodiments thereof, as illustrated in the accompanying drawings.

DETAILED DESCRIPTION OF EMBODIMENTS

Hereinafter, an embodiment of the present invention will be described with reference to the drawings.

In the figures, an X axis, a Y axis, and a Z axis orthogonal to one another are shown as appropriate. The X axis, the Y axis, and the Z axis are common in all figures.

1. Overall Configuration of Multi-Layer Ceramic Capacitor 10

Figure 1:
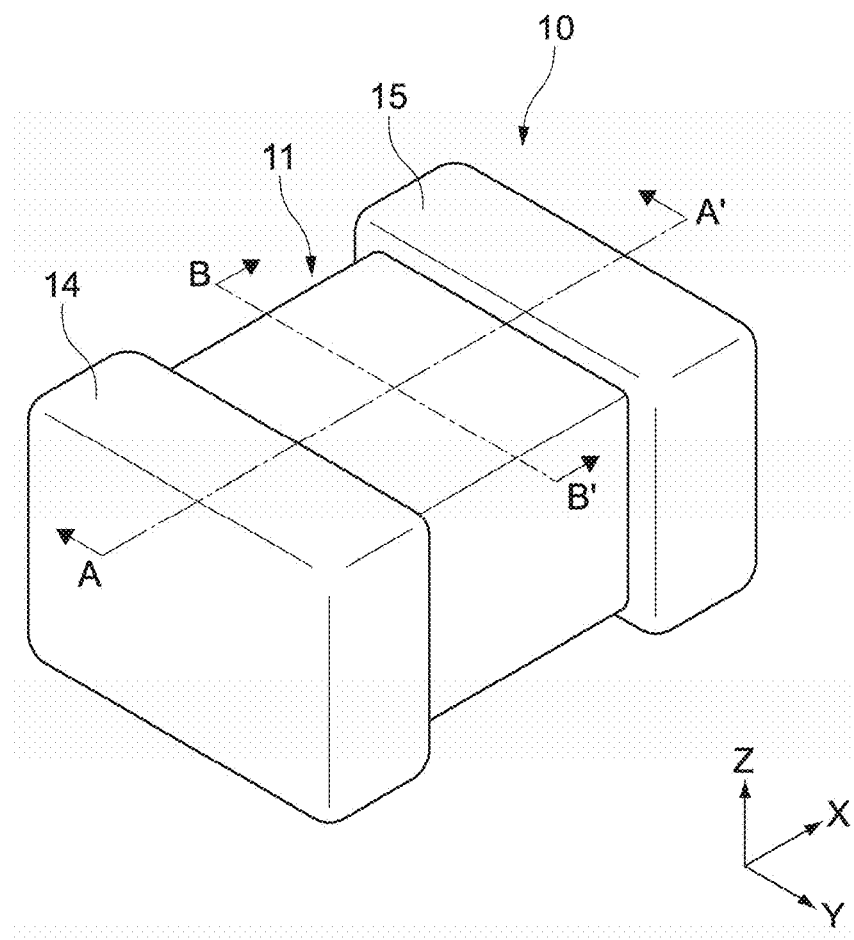
FIG. 1 is a perspective view of a multi-layer ceramic capacitor according to one embodiment of the present invention.
Figure 2:
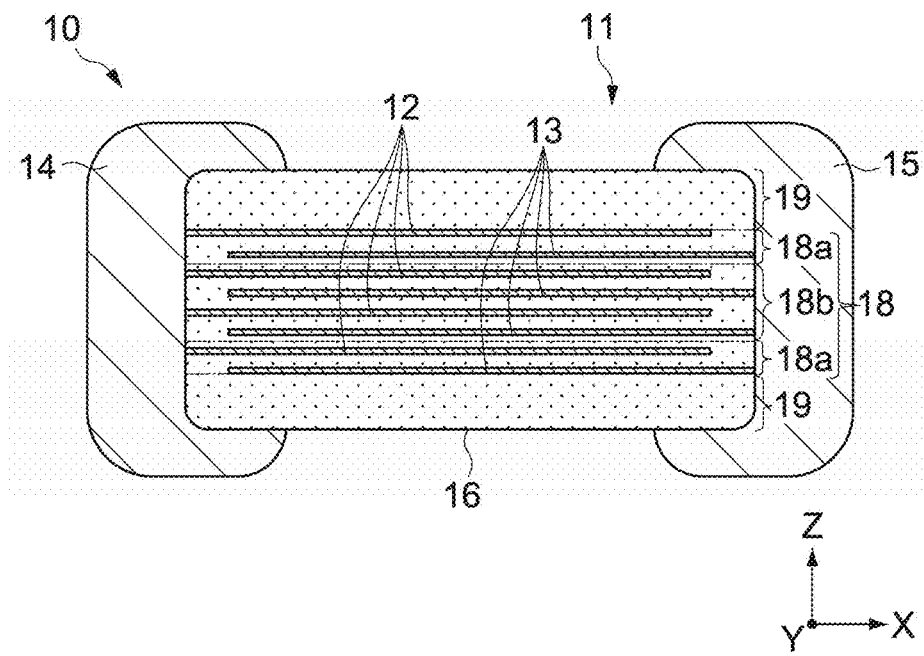
FIG. 2 is a cross-sectional view of the multi-layer ceramic capacitor taken along the A-A' line in FIG. 1.
Figure 3:
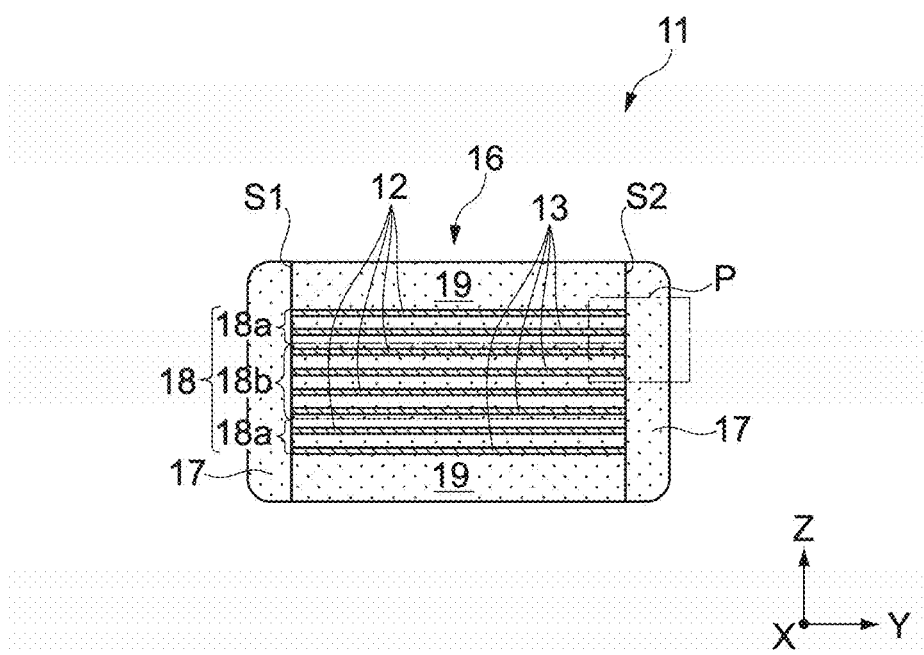
FIG. 3 is a cross-sectional view of the multi-layer ceramic capacitor taken along the B-B' line in FIG. 1.

FIGS. 1 to 3 each show a multi-layer ceramic capacitor 10 according to one embodiment of the present invention. FIG. 1 is a perspective view of the multi-layer ceramic capacitor 10. FIG. 2 is a cross-sectional view of the multi-layer ceramic capacitor 10 taken along the A-A' line in FIG. 1. FIG. 3 is a cross-sectional view of the multi-layer ceramic capacitor 10 taken along the B-B' line in FIG. 1.

The multi-layer ceramic capacitor 10 includes a body 11, a first external electrode 14, and a second external electrode 15.

Typically, the body 11 has two side surfaces oriented in a Y-axis direction and two main surfaces oriented in a Z-axis direction. Ridges connecting the respective surfaces of the body 11 are chamfered. It should be noted that the form of the body 11 is not limited to the form as described above. For example, the surfaces of the body 11 may be curved surfaces, and the body 11 may be rounded as a whole.

The first external electrode 14 and the second external electrode 15 cover both end surfaces of the body 11 that are oriented in an X-axis direction, and extend to four surfaces that are connected to both the end surfaces oriented in the X-axis direction. With this configuration, both of the first external electrode 14 and the second external electrode 15 have U-shaped cross sections in parallel with an X-Z plane and an X-Y plane.

The body 11 includes a multi-layer unit 16 and side margins 17.

The multi-layer unit 16 has a configuration in which a plurality of flat plate-like ceramic layers extending along the X-Y plane are laminated in the Z-axis direction.

The multi-layer unit 16 includes a capacitance forming unit 18 and covers 19.

The capacitance forming unit 18 includes a plurality of first internal electrodes 12 and a plurality of second internal electrodes 13. The first internal electrodes 12 and the second internal electrodes 13 are alternately disposed between the ceramic layers along the Z-axis direction. The first internal electrodes 12 are connected to the first external electrode 14 and are insulated from the second external electrode 15. The second internal electrodes 13 are connected to the second external electrode 15 and are insulated from the first external electrode 14.

The first internal electrodes 12 and the second internal electrodes 13 are each made of an electrical conductive material and function as internal electrodes of the multi-layer ceramic capacitor 10. Examples of the electrical conductive material include a metal material mainly containing nickel (Ni).

As shown in FIGS. 2 and 3, the capacitance forming unit 18 includes first portions 18a adjacent to the respective covers 19 and a second portion 18b adjacent to the first portions 18a in the Z-axis direction. In other words, the first portions 18a form both end portions of the capacitance forming unit 18 in the Z-axis direction, and the second portion 18b forms the center portion of the capacitance forming unit 18 in the Z-axis direction.

As shown in FIG. 3, the first portions 18a are covered with the covers 19 from the Z-axis direction and with the side margins 17 from the Y-axis direction. As shown in FIG. 3, the second portion 18b is covered with the first portions 18a in the Z-axis direction and with the side margins 17 in the Y-axis direction.

The capacitance forming unit 18 is made of ceramics. In the capacitance forming unit 18, in order to increase capacitances of the ceramic layers provided between the first internal electrodes 12 and the second internal electrodes 13, a material having a high dielectric constant is used as a material forming the ceramic layers. For the material forming the capacitance forming unit 18, polycrystal of a barium titanate ($BaTiO_3$) based material, i.e., polycrystal having a Perovskite structure containing barium (Ba) and titanium (Ti) can be used, for example.

Alternatively, the material forming the capacitance forming unit 18 may be, in addition to a barium titanate ($BaTiO_3$) based material, polycrystal of a strontium titanate ($SrTiO_3$) based material, a calcium titanate ($CaTiO_3$) based material, a magnesium titanate ($MgTiO_3$) based material, a calcium zirconate ($CaZrO_3$) based material, a calcium zirconate titanate ($Ca(Zr,Ti)O_3$) based material, a barium zirconate ($BaZrO_3$) based material, a titanium oxide ($TiO_2$) based material, or the like.

The covers 19 each have a flat plate-like shape extending along the X-Y plane and respectively cover the upper and lower surfaces of the capacitance forming unit 18 in the Z-axis direction. The covers 19 are not provided with the first internal electrodes 12 and the second internal electrodes 13.

As shown in FIG. 3, the side margins 17 are formed on both side surfaces S1 and S2 of the capacitance forming unit 18 and covers 19, the side surfaces S1 and S2 being oriented in the Y-axis direction.

In such a manner, in the body 11, except for both the end surfaces, which are oriented in the X-axis direction and to which the first external electrode 14 and the second external electrode 15 are provided, surfaces of the capacitance forming unit 18 are covered with the side margins 17 and the covers 19. The side margins 17 and the covers 19 have main functions of protecting the periphery of the capacitance forming unit 18 and ensuring insulation properties of the first internal electrodes 12 and the second internal electrodes 13.

The side margins 17 and the covers 19 are also made of ceramics. The material of the side margins 17 and the covers 19 is insulating ceramics. Use of dielectrics including the same type of composition system as that of the capacitance forming unit 18 leads to suppression of internal stress in the body 11.

The side margins 17, the covers 19, and the capacitance forming unit 18 may further contain a metal element such as magnesium (Mg), manganese (Mn), aluminum (Al), calcium (Ca), vanadium (V), chromium (Cr), zirconium (Zr), molybdenum (Mo), tungsten (W), tantalum (Ta), niobium (Nb), silicon (Si), boron (B), yttrium (Y), europium (Eu), gadolinium (Gd), dysprosium (Dy), holmium (Ho), erbium (Er), ytterbium (Yb), lithium (Li), potassium (K), or sodium (Na).

With the configuration described above, when a voltage is applied between the first external electrode 14 and the second external electrode 15 in the multi-layer ceramic capacitor 10, a voltage is applied to the ceramic layers between the first internal electrodes 12 and the second internal electrodes 13. With this configuration, the multi-layer ceramic capacitor 10 stores charge corresponding to the voltage applied between the first external electrode 14 and the second external electrode 15.

It should be noted that the multi-layer ceramic capacitor 10 according to this embodiment only needs to include the multi-layer unit 16 and the side margins 17, and other configurations can be changed as appropriate. For example, the number of first internal electrodes 12 and second internal electrodes 13 can be determined as appropriate in accordance with the size and performance expected for the multi-layer ceramic capacitor 10.

Further, in FIGS. 2 and 3, in order to make the facing state of the first and second internal electrodes 12 and 13 easily viewable, the number of first internal electrodes 12 and the number of second internal electrodes 13 are each set to four. However, actually, more first and second internal electrodes 12 and 13 are provided so as to ensure the capacitance of the multi-layer ceramic capacitor 10.

2. Oxidized Areas E1 And E2

Figure 4:
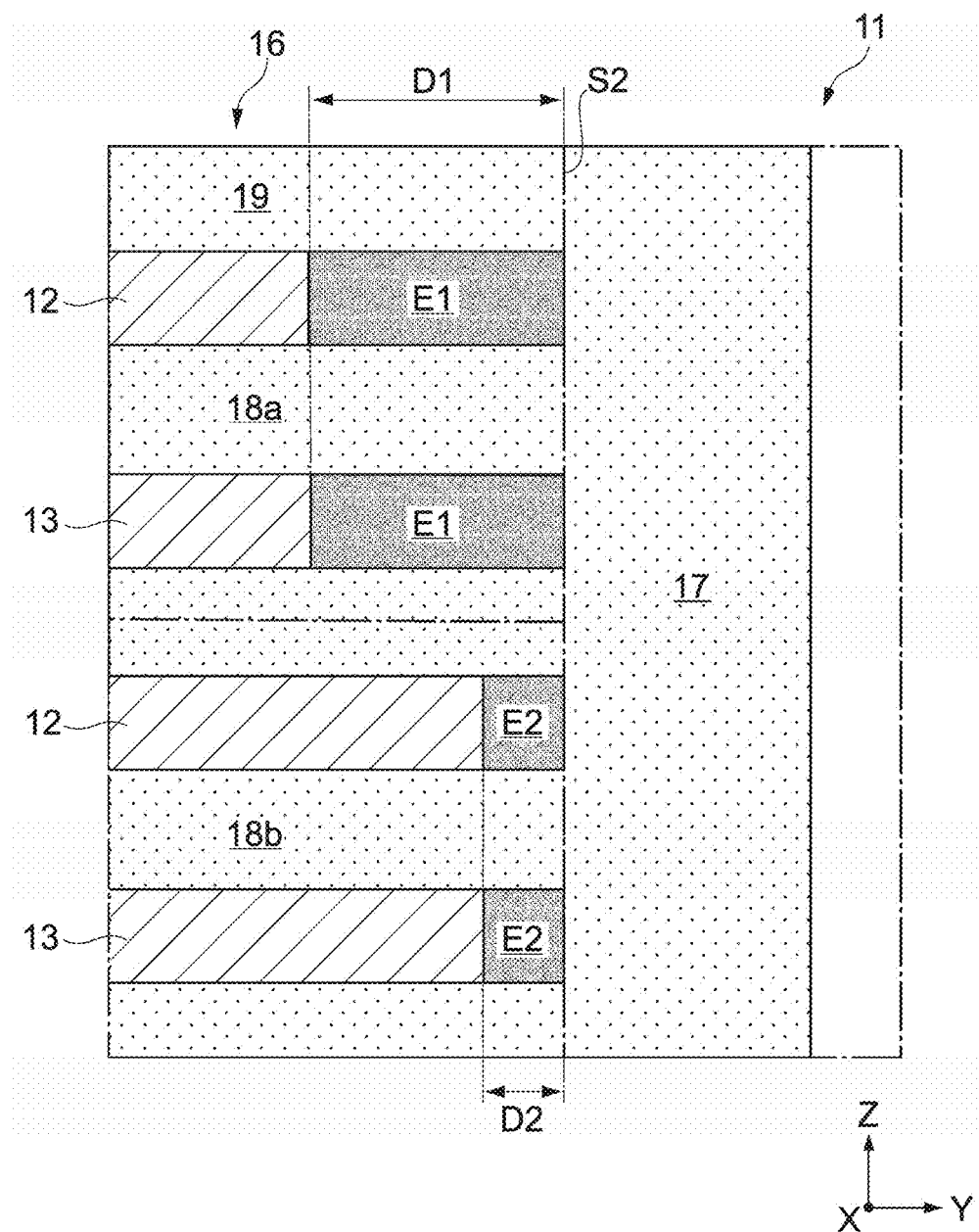
FIG. 4 is an enlarged schematic view of an area P of the multi-layer ceramic capacitor shown in FIG. 3.

FIG. 4 is an enlarged schematic view of an area P shown in FIG. 3 and shows ends of the first internal electrodes 12 and the second internal electrodes 13 in the first portion 18a and the second portion 18b in an enlarged manner.

As shown in FIG. 4, the first internal electrodes 12 and the second internal electrodes 13 include oxidized areas E1 and E2 at the end of the multi-layer unit 16, the end being exposed to the side surface S1 or S2. The oxidized areas E1 and E2 are areas in which electrical conductivity is reduced by oxidation. As shown in FIG. 4, the oxidized areas E1 and E2 are adjacent to the side margin 17.

Here, the oxidized areas E1 are formed at the ends of the first internal electrode 12 and the second internal electrode 13 in the first portion 18a, and the oxidized areas E2 are formed at the ends of the first internal electrode 12 and the second internal electrode 13 in the second portion 18b. As shown in FIG. 4, a dimension D1 of the oxidized area E1 in the Y-axis direction is larger than a dimension D2 of the oxidized area E2 in the Y-axis direction.

It should be noted that FIG. 4 shows that the oxidized areas E1 each have an equal dimension D1 and the oxidized areas E2 each have an equal dimension D2 for the purpose of description. However, each oxidized area E1 may have a different dimension D1 and each oxidized area E2 may have a different dimension D2. In this case, the dimension D1 can be an average value for all the oxidized areas E1, and the dimension D2 can be an average value for all the oxidized areas E2.

The oxidized areas E1 are preferably formed at all the ends of the first internal electrodes 12 and the second internal electrodes 13 in the first portions 18a, but may not be partially formed. Similarly, the oxidized areas E2 are preferably formed at all the ends of the first internal electrodes 12 and the second internal electrodes 13 in the second portion 18b, but may not be partially formed.

The body 11 according to this embodiment exhibits a characteristic composition distribution where a metal element that forms a composite oxide together with nickel (Ni) is intensively included in the oxidized areas E1 and E2. Examples of such a metal element include magnesium (Mg) and manganese (Mn). The oxidized areas E1 and E2 are mainly formed of a composite oxide containing this metal element and nickel (Ni).

The composite oxide forming the oxidized areas E1 and E2 is typically a ternary oxide containing magnesium (Mg) or manganese (Mn) and nickel (Ni). However, the composite oxide may contain both of magnesium (Mg) and manganese (Mn) and may contain another metal element exemplified above.

The dimensions D1 and D2 of the oxidized areas E1 and E2 can be set in the range of, for example, approximately several hundreds to several thousands nm.

Figure 5:
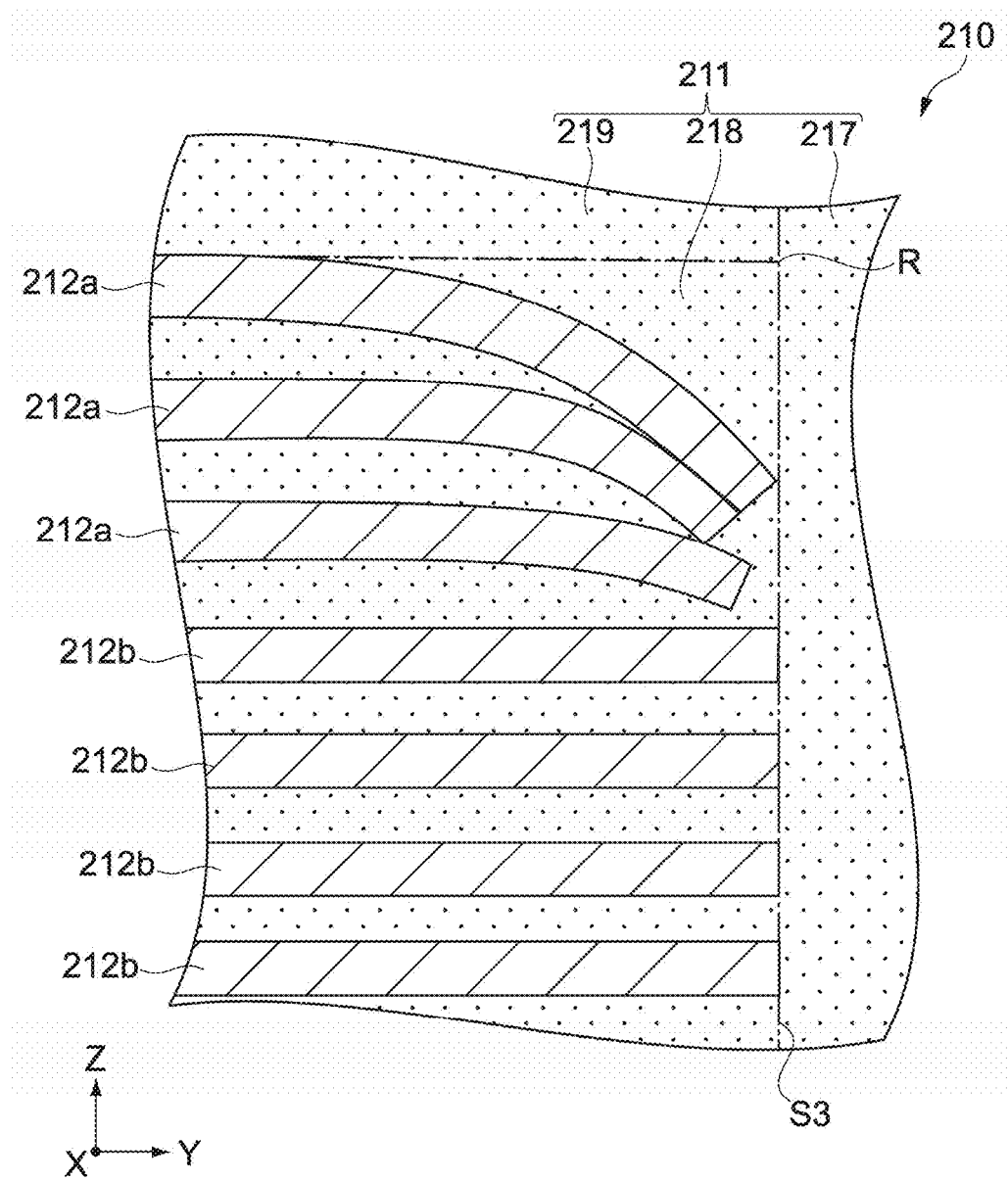
FIG. 5 is an enlarged cross-sectional view of a body of a multi-layer ceramic capacitor in the related art.

FIG. 5 is a partially enlarged cross-sectional view of a body 211 of a multi-layer ceramic capacitor 210 in the related art. With reference to FIG. 5, the action of the oxidized areas E1 and E2 according to this embodiment will be described as compared with the multi-layer ceramic capacitor 210 in the related art. As shown in FIG. 5, the body 211 of the multi-layer ceramic capacitor 210 includes a capacitance forming unit 218, a cover 219 that covers the capacitance forming unit 218 from the Z-axis direction, and a side margin 217 that covers the capacitance forming unit 218 and the cover 219 from the Y-axis direction.

As shown in FIG. 5, the capacitance forming unit 218 includes internal electrodes 212a located near the cover 219 and internal electrodes 212b located near the center of the capacitance forming unit 218.

In the multi-layer ceramic capacitor 210 in the related art, foreign substances derived from the internal electrodes and the like may adhere to the side surfaces of the unsintered capacitance forming unit in the production process. This may cause the internal electrodes 212a and 212b to be electrically conducted to each other via the foreign substances and cause a short circuit failure between the internal electrodes 212a and 212b on a side surface S3 of the sintered capacitance forming unit 218.

Further, in the multi-layer ceramic capacitor 210, the side margin 217, the capacitance forming unit 218, and the cover 219 have different shrinkage behaviors at the time of sintering. Because of this, when the unsintered body is sintered, stress is prone to be concentrated near a ridge R of the capacitance forming unit 218 that extends in the X-axis direction.

As a result, in the sintered body 211, the ends of the internal electrodes 212a in the Y-axis direction near the ridge R of the capacitance forming unit 218 may be deformed as shown in FIG. 5.

Furthermore, in the multi-layer ceramic capacitor 210, cutting using a push-cutting blade to be described later (see Step S03 to be described later) in the production process may also cause the ends of the internal electrodes 212a in the Y-axis direction near the ridge R to be deformed.

In the multi-layer ceramic capacitor 210, when the internal electrodes 212a near the ridge R of the capacitance forming unit 218 are deformed, as shown in FIG. 5, the ends of the internal electrodes 212a may come into contact with each other, and a short circuit failure may occur.

In contrast to this, as shown in FIG. 4, the multi-layer ceramic capacitor 10 according to this embodiment includes the oxidized areas E1 and E2 at the ends of the first internal electrodes 12 and the second internal electrodes 13. With this configuration, even when foreign substances and the like are adhering to the side surfaces of the unsintered multi-layer chip in the production process, it is possible to suppress electrical conduction between the first internal electrodes 12 and the second internal electrodes 13 via foreign substances and the like on the side surfaces S1 and S2 of the sintered multi-layer unit 16. Accordingly, a short circuit failure between the first internal electrodes 12 and the second internal electrodes 13 is suppressed.

Additionally, in this embodiment, as shown in FIG. 4, the oxidized areas E1 are large in the first portion 18a near the cover 19, in which the first internal electrodes 12 and the second internal electrodes 13 are easily deformed, and the oxidized areas E2 are small in the second portion 18b near the center of the capacitance forming unit 18, in which the first internal electrodes 12 and the second internal electrodes 13 are not easily deformed.

With this configuration, in the first portion 18a, electrical conduction between the first internal electrodes 12 and the second internal electrodes 13 by contact between the ends of the adjacent first internal electrodes 12 and second internal electrodes 13 is efficiently suppressed. Therefore, a short circuit failure of the multi-layer ceramic capacitor 10 is suppressed.

Meanwhile, the oxidized areas E2 are small in the second portion 18b, and thus a capacitance loss of the second portion 18b is suppressed. With this configuration, the multi-layer ceramic capacitor 10 can also ensure the capacitance.

3. Method of Producing Multi-Layer Ceramic Capacitor 10

Figure 6:
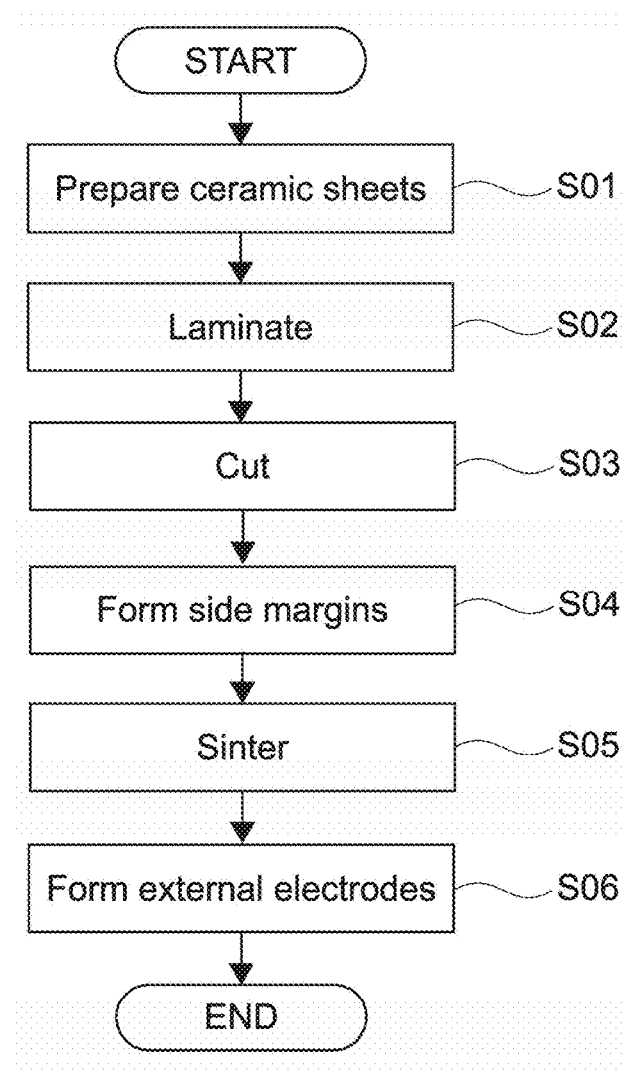
FIG. 6 is a flowchart showing a method of producing the multi-layer ceramic capacitor.
Figure 7:
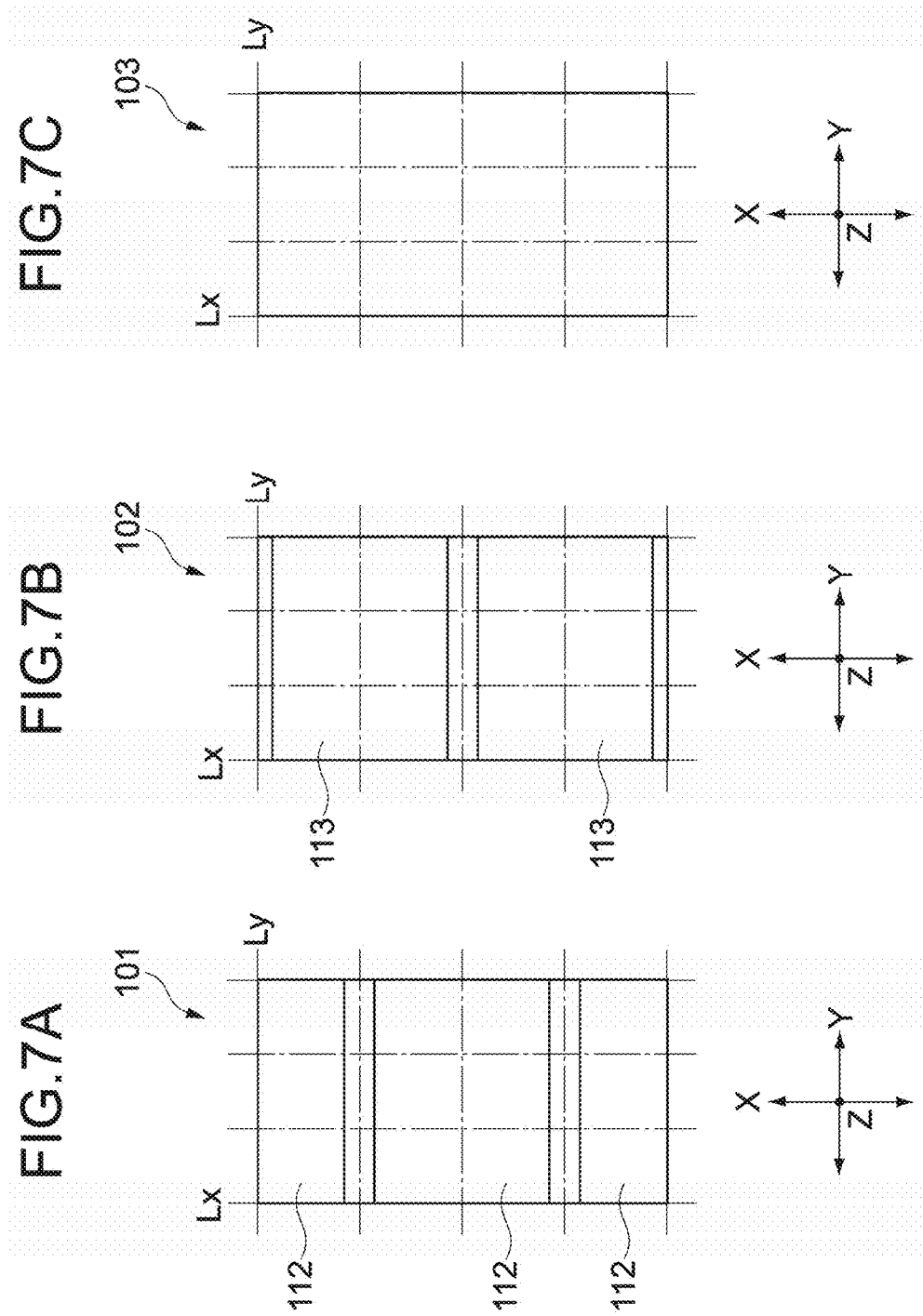
FIG. 7A is a plan view showing a production process of the multi-layer ceramic capacitor.
FIG. 7B is a plan view showing a production process of the multi-layer ceramic capacitor.
FIG. 7C is a plan view showing a production process of the multi-layer ceramic capacitor.

FIG. 6 is a flowchart showing a method of producing the multi-layer ceramic capacitor 10. FIGS. 7A to 12 are views each showing a production process of the multi-layer ceramic capacitor 10. Hereinafter, the method of producing the multi-layer ceramic capacitor 10 will be described along FIG. 6 with reference to FIGS. 7A to 12 as appropriate.

3.1 Step S01: Preparation of Ceramic Sheets

In Step S01, first ceramic sheets 101 and second ceramic sheets 102 for forming the capacitance forming unit 18, and third ceramic sheets 103 for forming the covers 19 are prepared.

The third ceramic sheets 103 are ceramic sheets containing a metal element that forms a composite oxide together with nickel (Ni). In this embodiment, for such a metal element, magnesium (Mg) is used. However, also when another metal element such as manganese (Mn) is used or when two or more types of metal elements are used, an action similar to that described below is obtained.

In addition to the metal elements as described above, the third ceramic sheets 103 may further contain a metal element such as aluminum (Al), calcium (Ca), vanadium (V), chromium (Cr), zirconium (Zr), molybdenum (Mo), tungsten (W), tantalum (Ta), niobium (Nb), silicon (Si), boron (B), yttrium (Y), europium (Eu), gadolinium (Gd), dysprosium (Dy), holmium (Ho), erbium (Er), ytterbium (Yb), lithium (Li), potassium (K), or sodium (Na).

Similarly, the first ceramic sheets 101 and the second ceramic sheets 102 may further contain a metal element such as magnesium (Mg), manganese (Mn), aluminum (Al), calcium (Ca), vanadium (V), chromium (Cr), zirconium (Zr), molybdenum (Mo), tungsten (W), tantalum (Ta), niobium (Nb), silicon (Si), boron (B), yttrium (Y), europium (Eu), gadolinium (Gd), dysprosium (Dy), holmium (Ho), erbium (Er), ytterbium (Yb), lithium (Li), potassium (K), or sodium (Na).

The first, second, and third ceramic sheets 101, 102, and 103 are configured as unsintered dielectric green sheets and formed into sheets by using a roll coater or a doctor blade, for example.

FIGS. 7A, 7B, and 7C are plan views of the first, second, and third ceramic sheets 101, 102, and 103, respectively. At this stage, the first, second, and third ceramic sheets 101, 102, and 103 are not yet cut into the multi-layer ceramic capacitors 10. FIGS. 7A, 7B, and 7C each show cutting lines Lx and Ly used when the sheets are cut into the multi-layer ceramic capacitors 10. The cutting lines Lx are parallel to the X axis, and the cutting lines Ly are parallel to the Y axis.

As shown in FIGS. 7A, 7B, and 7C, unsintered first internal electrodes 112 corresponding to the first internal electrodes 12 are formed on the first ceramic sheet 101, and unsintered second internal electrodes 113 corresponding to the second internal electrodes 13 are formed on the second ceramic sheet 102. It should be noted that no internal electrodes are formed on the third ceramic sheet 103 corresponding to the cover 19.

The first and second internal electrodes 112 and 113 can be formed using an electrical conductive paste containing nickel (Ni), for example. For formation of the first and second internal electrodes 112 and 113 by use of an electrical conductive paste, a screen printing method or a gravure printing method can be used, for example.

Each of the first and second internal electrodes 112 and 113 is disposed over two areas and extends like a belt in the Y-axis direction. The two areas are adjacent to each other in the X-axis direction and divided by the cutting line Ly. The first internal electrodes 112 are shifted from the second internal electrodes 113 in the X-axis direction by one row including the areas divided by the cutting lines Ly. In other words, the cutting line Ly passing through the center of the first internal electrode 112 passes through an area between the second internal electrodes 113, and the cutting line Ly passing through the center of the second internal electrode 113 passes through an area between the first internal electrodes 112.

3.2 Step S02: Lamination

In Step S02, the first, second, and third ceramic sheets 101, 102, and 103 prepared in Step S01 are laminated, to produce a multi-layer sheet 104.

Figure 8:
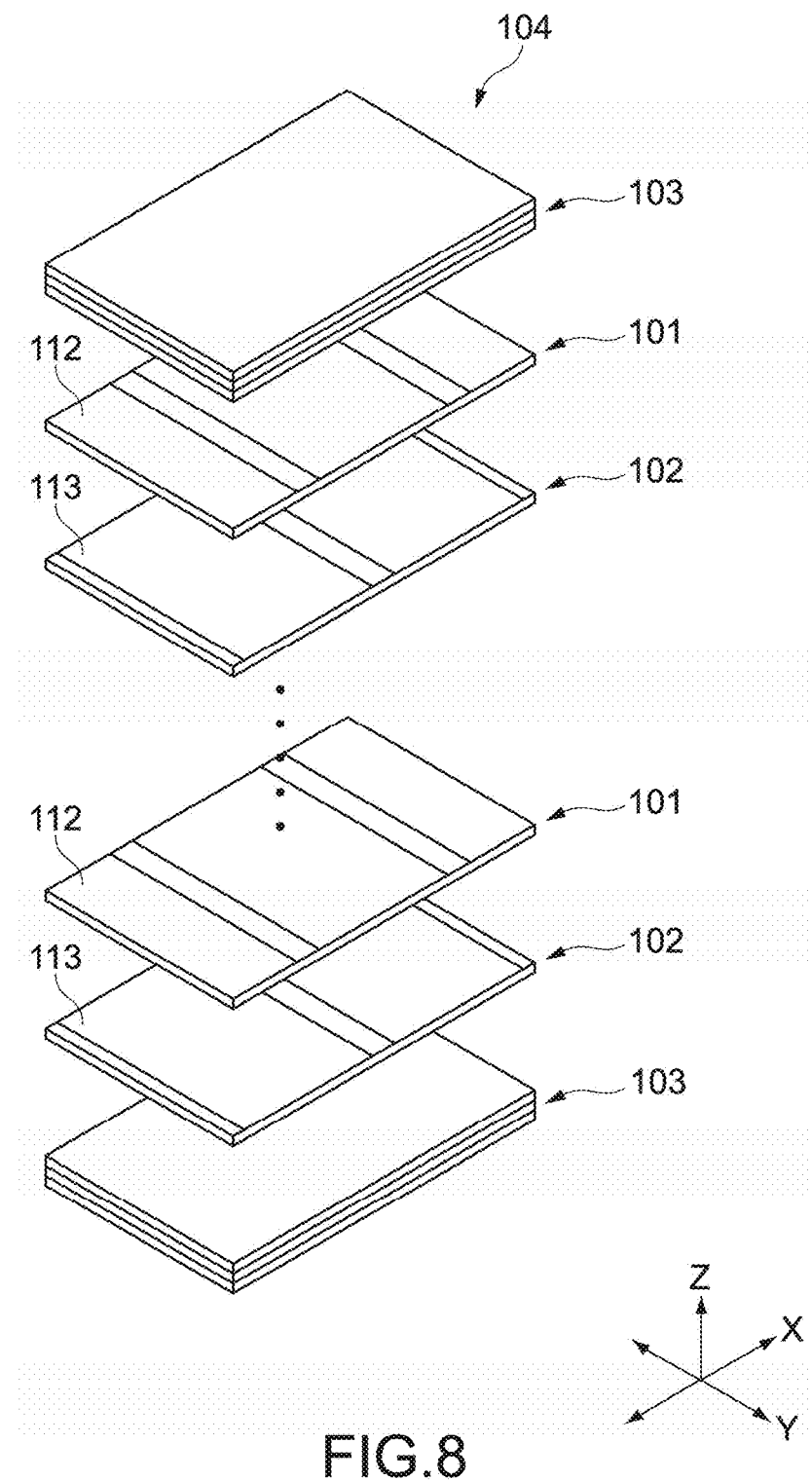
FIG. 8 is a perspective view showing the production process of the multi-layer ceramic capacitor.

FIG. 8 is a perspective view of the multi-layer sheet 104 obtained in Step S02. For the purpose of description, FIG. 8 shows the first, second, and third ceramic sheets 101, 102, and 103 in an exploded manner. In an actual multi-layer sheet 104, however, the first, second, and third ceramic sheets 101, 102, and 103 are pressure-bonded by hydrostatic pressing, uniaxial pressing, or the like for integration. With this configuration, a high-density multi-layer sheet 104 is obtained.

In the multi-layer sheet 104, the first ceramic sheets 101 and the second ceramic sheets 102 that correspond to the capacitance forming unit 18 are alternately laminated in the Z-axis direction.

Further, in the multi-layer sheet 104, the third ceramic sheets 103 corresponding to the covers 19 are laminated on the uppermost and lowermost surfaces of the first and second ceramic sheets 101 and 102 alternately laminated in the Z-axis direction.

The plurality of third ceramic sheets 103 are laminated to the extent that the entire thickness in the Z-axis direction is 15 μm or less. It should be noted that in the example shown in FIG. 8, three third ceramic sheets 103 are laminated on each of the uppermost and lowermost surfaces of the laminated first and second ceramic sheets 101 and 102, but the number of third ceramic sheets 103 can be changed as appropriate.

3.3 Step S03: Cutting

In Step S03, the multi-layer sheet 104 obtained in Step S02 is cut with a rotary blade, a push-cutting blade, or the like, to produce unsintered multi-layer chips 116.

Figure 9:
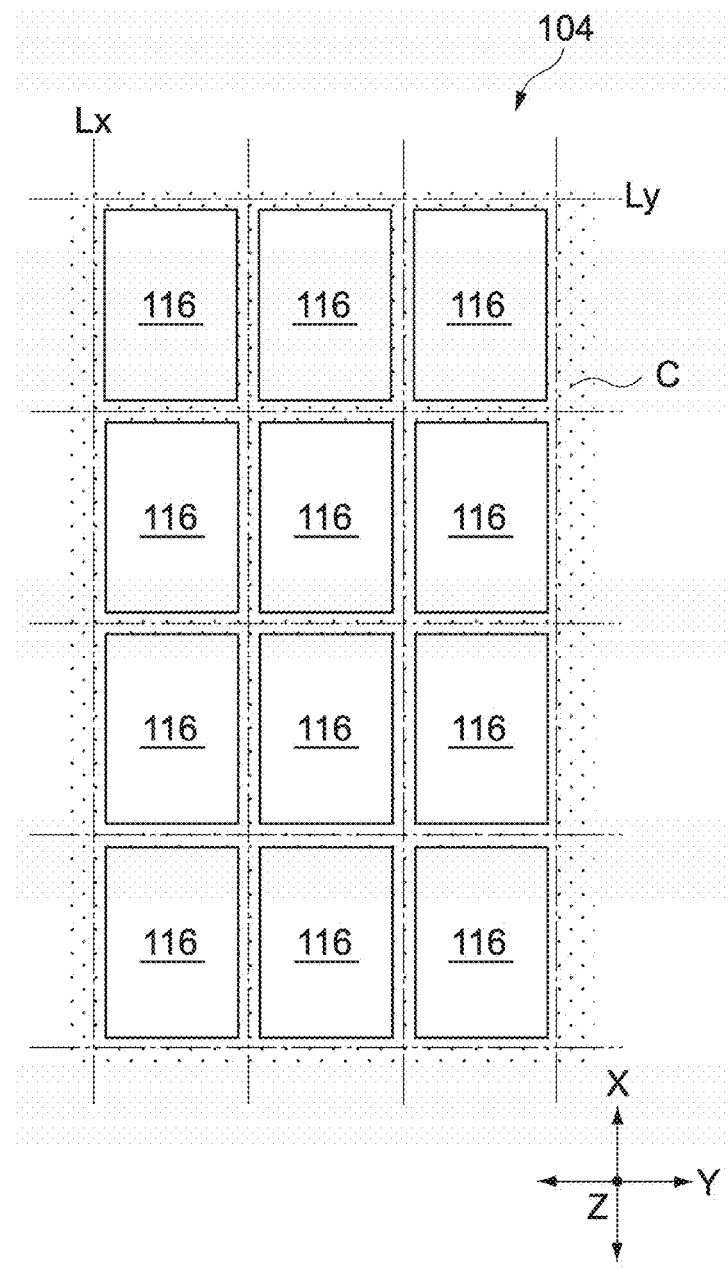
FIG. 9 is a plan view showing the production process of the multi-layer ceramic capacitor.

FIG. 9 is a plan view of the multi-layer sheet 104 after Step S03. The multi-layer sheet 104 is cut along the cutting lines Lx and Ly while being fixed to a holding member C. With this configuration, the multi-layer sheet 104 is singulated, so that the multi-layer chips 116 are obtained. At that time, the holding member C is not cut, and thus the multi-layer chips 116 are connected via the holding member C.

Figure 10:
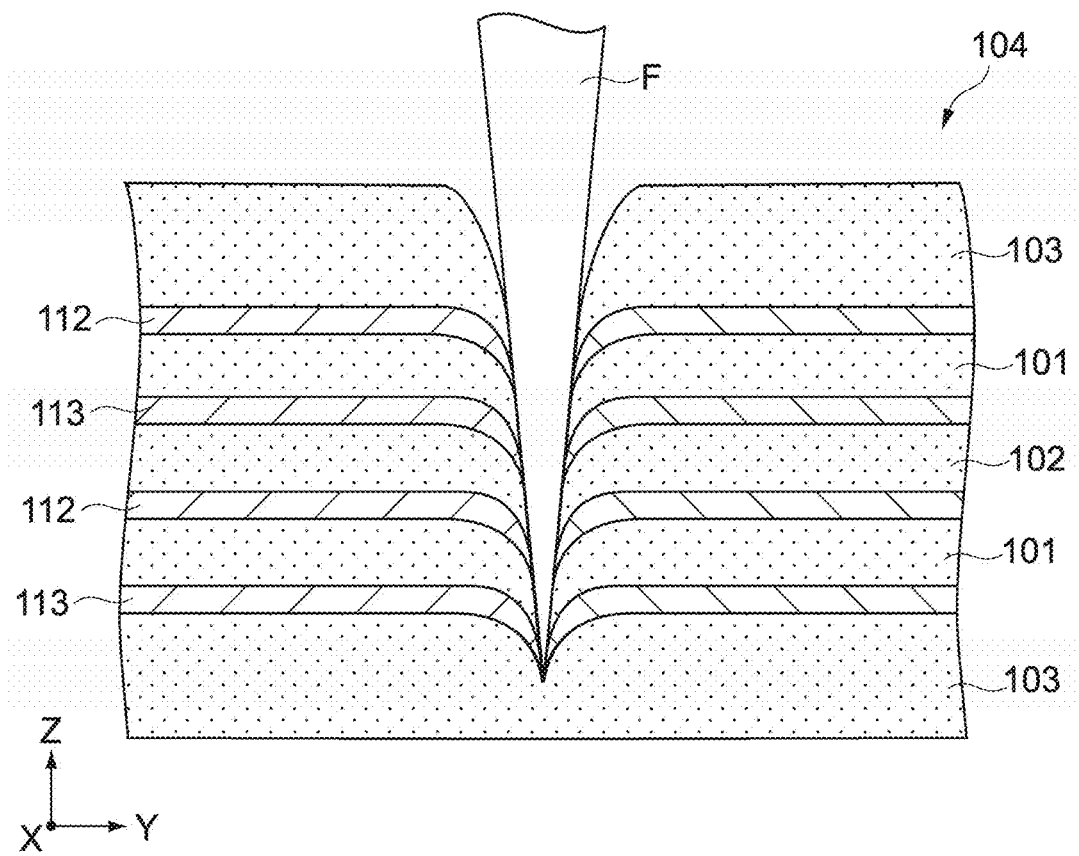
FIG. 10 is a cross-sectional view showing the production process of the multi-layer ceramic capacitor.

FIG. 10 is a diagram showing a state where the multi-layer sheet 104 is being cut. In FIG. 10, for the purpose of description, the number of first and second internal electrodes 112 and 113 is four in total, and the number of first, second, and third ceramic sheets 101, 102, and 103 is five in total. However, actually, more first and second internal electrodes 112 and 113 and more first and second ceramic sheets 101 and 102 are provided.

When the multi-layer sheet 104 is cut with a cutting blade F such as a push-cutting blade, the cutting blade F that is cutting the multi-layer sheet 104 may drag the first and second internal electrodes 112 and 113, and the ends of the first and second internal electrodes 112 and 113 may be extended in the Z-axis direction as shown in FIG. 10. As a result, on the side surface of the multi-layer chip 116, the first and second internal electrodes 112 and 113 may come into contact with each other via the extended internal electrodes and cause a short circuit failure.

However, as shown in FIG. 4, the first and second internal electrodes 112 and 113 according to this embodiment include the oxidized areas E1 and E2 that are successively formed at the ends thereof by sintering to be described later. Therefore, even when the first and second internal electrodes 112 and 113 are dragged at the time of cutting the multi-layer sheet 104, and the ends of the first and second internal electrodes 112 and 113 come into contact with each other via the dragged internal electrodes, a short circuit failure between the first and second internal electrodes 112 and 113 is suppressed.

Figure 11:
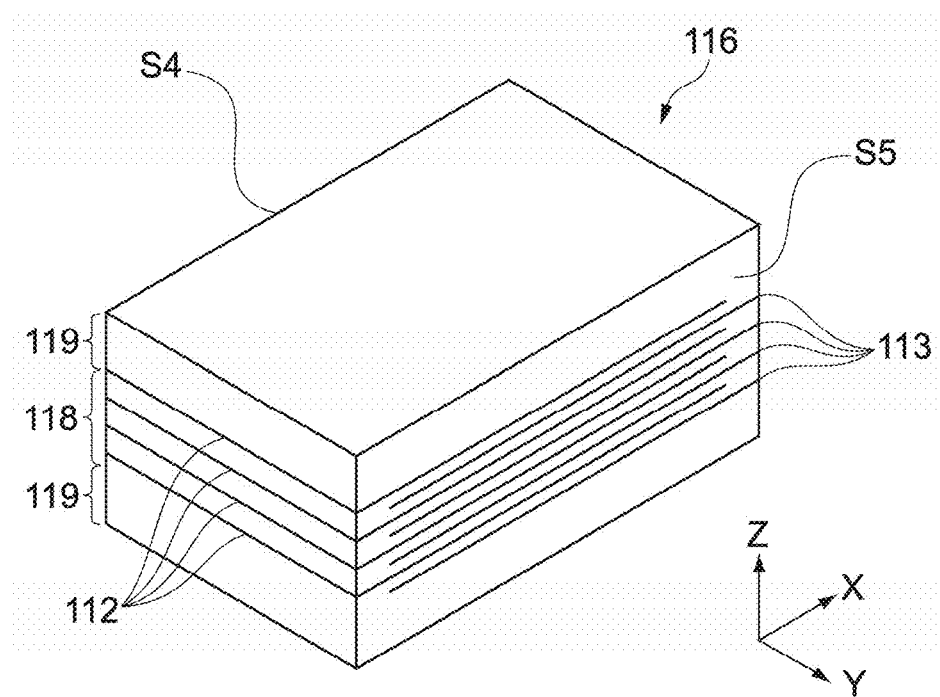
FIG. 11 is a perspective view showing the production process of the multi-layer ceramic capacitor.

FIG. 11 is a perspective view of the multi-layer chip 116 obtained in Step S03. The multi-layer chip 116 includes a capacitance forming unit 118 and covers 119 that are unsintered. In the multi-layer chip 116, the unsintered first and second internal electrodes 112 and 113 are exposed to the cut surfaces, i.e., both side surfaces S4 and S5 oriented in the Y-axis direction.

3.4 Step S04: Formation of Side Margins

In Step S04, unsintered side margins 117 are provided to the side surfaces S4 and S5 of the multi-layer chip 116 obtained in Step S03, to produce an unsintered body 111.

In Step S04, in order to provide the side margins 117 to both the side surfaces S4 and S5 of the multi-layer chip 116, the orientation of the multi-layer chip 116 is changed as appropriate by replacement of a holding member such as a tape, for example.

In particular, in Step S04, the side margins 117 are provided to both the side surfaces S4 and S5 of the multi-layer chip 116 that are oriented in the Y-axis direction, both the side surfaces S4 and S5 being the cut surfaces of the multi-layer chip 116 in Step S03. For that reason, in Step S04, it is desirable to previously detach the multi-layer chips 116 from the holding member C and rotate the multi-layer chips 116 by 90 degrees.

Figure 12:
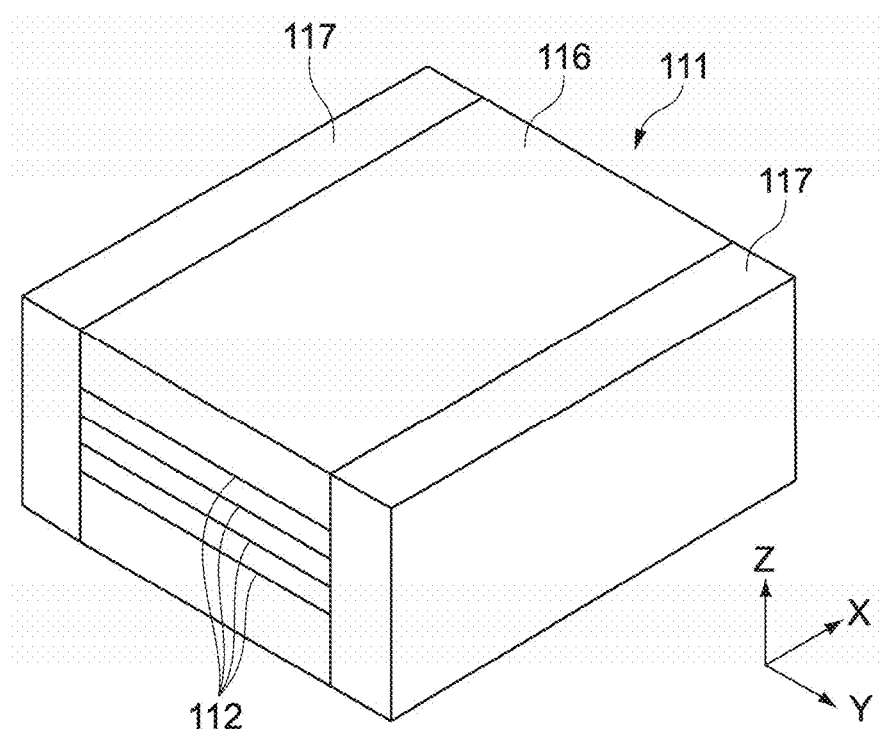
FIG. 12 is a perspective view showing the production process of the multi-layer ceramic capacitor.

FIG. 12 is a perspective view of the unsintered body 111 obtained in Step S04.

The side margins 117 are prepared as ceramic sheets containing magnesium (Mg) as a metal element that forms a composite oxide together with nickel (Ni). Similarly to the third ceramic sheets 103, the metal element used for those ceramic sheets may also be manganese (Mn) or the like other than magnesium (Mg).

Subsequently, the side margins 117 are attached to the side surfaces S4 and S5 of the multi-layer chip 116.

In addition to the metal elements as described above, the side margins 117 may further contain a metal element such as manganese (Mn), aluminum (Al), calcium (Ca), vanadium (V), chromium (Cr), zirconium (Zr), molybdenum (Mo), tungsten (W), tantalum (Ta), niobium (Nb), silicon (Si), boron (B), yttrium (Y), europium (Eu), gadolinium (Gd), dysprosium (Dy), holmium (Ho), erbium (Er), ytterbium (Yb), lithium (Li), potassium (K), or sodium (Na).

The concentration of magnesium (Mg) of the side margins 117 according to this embodiment is equal to or lower than the concentration of magnesium (Mg) of the third ceramic sheets 103.

The thickness of the side margins 117 in the Y-axis direction is adjusted so as to be 15 μm or less.

In Step S04, the side margins 117 are not formed into sheets but formed by immersing the side surfaces S4 and S5 of the multi-layer chip 116 in a paste material made of ceramics containing magnesium (Mg) and then pulling out the side surfaces S4 and S5 from the paste material.

3.5 Step S05: Sintering

In Step S05, the unsintered body 111 obtained in Step S04 is sintered to produce the body 11 of the multi-layer ceramic capacitor 10 shown in FIGS. 1 to 3.

In other words, in Step S05, the first and second internal electrodes 112 and 113 become the first and second internal electrodes 12 and 13, respectively, the multi-layer chip 116 becomes the multi-layer unit 16, and the side margins 117 become the side margins 17.

A sintering temperature for the body 111 in Step S05 can be determined on the basis of a sintering temperature for the multi-layer chip 116 and the side margins 117. For example, when a barium titanate ($BaTiO_3$) based material is used as the ceramics, the sintering temperature for the body 111 can be set to approximately 1,000 to 1,300° C. Further, sintering can be performed in a reduction atmosphere or a low-oxygen partial pressure atmosphere, for example.

Here, in the body 111 according to this embodiment, the thickness of the covers 119 and that of the side margins 117 are adjusted so as to be 15 μm or less. As a result, at the time of sintering, oxygen is easily supplied to the first and second internal electrodes 112 and 113, and the oxidized areas E1 and E2 are successfully formed at the ends of the first and second internal electrodes 112 and 113.

Therefore, even when foreign substances and the like adhere to the side surfaces S4 and S5 of the multi-layer chip 116 in the production process, in which the ends of the first and second internal electrodes 112 and 113 are exposed to the side surfaces S4 and S5, it is possible to suppress electrical conduction between the first internal electrodes 12 and the second internal electrodes 13 via the foreign substances and the like on the side surfaces S1 and S2 of the sintered body 11. Accordingly, a short circuit failure between the first internal electrodes 12 and the second internal electrodes 13 is suppressed.

Further, in this embodiment, the thickness of the covers 119 and that of the side margins 117 are adjusted so as to be 15 μm or less as described above. As a result, oxygen is supplied to the vicinity of the ridge of the capacitance forming unit 118 from not only the side margin 117 side but also the cover 119 side.

Furthermore, the concentration of magnesium (Mg) of the covers 119 is equal to or higher than the concentration of magnesium (Mg) of the side margins 117. As a result, magnesium (Mg) is supplied to the vicinity of the ridge of the capacitance forming unit 118 from not only the side margins 117 but also the covers 119.

Therefore, at the time of sintering the unsintered body 111, a larger amount of magnesium (Mg) and a larger amount of oxygen are supplied to the ends of the first and second internal electrodes 112 and 113 located near the ridge of the capacitance forming unit 118 than those supplied to the ends of the other first and second internal electrodes 112 and 113.

As a result, a larger amount of the composite oxide containing magnesium (Mg) is formed at the ends of the first and second internal electrodes 112 and 113 located near the ridge of the capacitance forming unit 118 than that formed at the ends of the other first and second internal electrodes 112 and 113. Accordingly, the large oxidized areas E1 are formed at the ends of the first and second internal electrodes 112 and 113, which are located near the ridge of the capacitance forming unit 118 and are easily deformed.

Therefore, electrical conduction between the first internal electrodes 12 and the second internal electrodes 13 by contact between the ends of the adjacent first internal electrodes 12 and second internal electrodes 13 is efficiently suppressed near the ridge of the sintered capacitance forming unit 18. Therefore, a short circuit failure of the multi-layer ceramic capacitor 10 is suppressed.

Meanwhile, at the time of sintering the unsintered body 111, a larger amount of magnesium (Mg) is supplied to the ends of the first and second internal electrodes 112 and 113 located near the ridge of the capacitance forming unit 118 than that supplied to the ends of the other first and second internal electrodes 112 and 113. Thus, the amount of supply of magnesium (Mg) is relatively small at the ends of the first and second internal electrodes 112 and 113 located near the center of the capacitance forming unit 118.

As a result, the small oxidized areas E2 are formed at the ends of the first and second internal electrodes 12 and 13 located near the center of the sintered capacitance forming unit 18, and thus the capacitance loss near the center of the capacitance forming unit 18 is suppressed. Therefore, the multi-layer ceramic capacitor 10 can also ensure the capacitance.

3.6 Step S06: Formation of External Electrodes

In Step S06, the first external electrode 14 and the second external electrode 15 are formed on the body 11 obtained in Step S05, to produce the multi-layer ceramic capacitor 10 shown in FIGS. 1 to 3.

In Step S06, first, an unsintered electrode material is applied so as to cover one of the end surfaces of the body 11 and then applied so as to cover the other one of the end surfaces of the body 11, the end surfaces being oriented in the X-axis direction. The applied unsintered electrode materials are subjected to baking in a reduction atmosphere or a low-oxygen partial pressure atmosphere, for example, to form base films on the body 11. On the base films baked onto the body 11, intermediate films and surface films are formed by plating such as electrolytic plating. Thus, the first external electrode 14 and the second external electrode 15 are completed.

It should be noted that part of the processing in Step S06 described above may be performed before Step S05. For example, before Step S05, the unsintered electrode material may be applied to both the end surfaces of the unsintered body 111 that are oriented in the X-axis direction, and in Step S05, the unsintered body 111 may be sintered and, simultaneously, the unsintered electrode material may be baked to form base films of the first external electrode 14 and the second external electrode 15.

4. Examples

Hereinafter, Examples of the present invention will be described.

4.1 Production of Multi-layer Ceramic Capacitor

4.1.1 Production of Unsintered Body

Samples of unsintered bodies according to Examples 1 to 6 and Comparative Examples 1 to 4 were produced by the production method described above. The samples according to Examples 1 to 6 and Comparative Examples 1 to 4 are different from one another in the thickness of the cover, the thickness of the side margin, and concentrations of manganese and magnesium in the cover and the side margin and are common in other production conditions.

4.1.2 Example 1

In a sample according to Example 1, the covers 119 and the side margins 117 each have a thickness of 15 μm. Further, assuming that barium titanate (BaTiO$_3$) forming the covers 119 and the side margins 117 is set to 100 mol %, the concentration of magnesium in the covers 119 and the side margins 117 is 0.48 mol %.

4.1.3 Example 2

In a sample according to Example 2, the covers 119 and the side margins 117 each have a thickness of 15 μm. Further, assuming that barium titanate (BaTiO$_3$) forming the covers 119 and the side margins 117 is set to 100 mol %, the concentration of magnesium in the covers 119 is 0.96 mol %, and the concentration of magnesium in the side margins 117 is 0.48 mol %.

4.1.4 Example 3

In a sample according to Example 3, the covers 119 and the side margins 117 each have a thickness of 10 μm. Further, assuming that barium titanate (BaTiO$_3$) forming the covers 119 and the side margins 117 is set to 100 mol %, the concentration of magnesium in the covers 119 and the side margins 117 is 0.48 mol %.

4.1.5 Example 4

In a sample according to Example 4, the covers 119 and the side margins 117 each have a thickness of 15 μm. Further, assuming that barium titanate (BaTiO$_3$) forming the covers 119 and the side margins 117 is set to 100 mol %, the concentration of manganese in the covers 119 and the side margins 117 is 0.48 mol %.

4.1.6 Example 5

In a sample according to Example 5, the covers 119 and the side margins 117 each have a thickness of 15 μm. Further, assuming that barium titanate (BaTiO$_3$) forming the covers 119 and the side margins 117 is set to 100 mol %, the concentration of manganese in the covers 119 is 0.96 mol %, and the concentration of manganese in the side margins 117 is 0.48 mol %.

4.1.7 Example 6

In a sample according to Example 6, the covers 119 and the side margins 117 each have a thickness of 10 μm. Further, assuming that barium titanate (BaTiO$_3$) forming the covers 119 and the side margins 117 is set to 100 mol %, the concentration of manganese in the covers 119 and the side margins 117 is 0.48 mol %.

4.1.8 Comparative Example 1

In a sample according to Comparative Example 1, the covers and the side margins each have a thickness of 20 μm. Further, assuming that barium titanate (BaTiO$_3$) forming the covers and the side margins is set to 100 mol %, the concentration of magnesium in the covers and the side margins is 0.48 mol %.

4.1.9 Comparative Example 2

In a sample according to Comparative Example 2, the covers and the side margins each have a thickness of 15 μm. Further, assuming that barium titanate (BaTiO$_3$) forming the covers and the side margins is set to 100 mol %, the concentration of magnesium in the covers is 0.48 mol %, and the concentration of magnesium in the side margins is 0.96 mol %.

4.1.10 Comparative Example 3

In a sample according to Comparative Example 3, the covers and the side margins each have a thickness of 20 μm. Further, assuming that barium titanate ($BaTiO_3$) forming the covers and the side margins is set to 100 mol %, the concentration of manganese in the covers and the side margins is 0.48 mol %.

4.1.11 Comparative Example 4

In a sample according to Comparative Example 4, the covers and the side margins each have a thickness of 15 μm. Further, assuming that barium titanate ($BaTiO_3$) forming the covers and the side margins is set to 100 mol %, the concentration of manganese in the covers is 0.48 mol %, and the concentration of manganese in the side margins is 0.96 mol %.

4.1.12 Production of Multi-layer Ceramic Capacitor

Multi-layer ceramic capacitors according to Examples 1 to 6 and Comparative Examples 1 to 4 were produced using the unsintered bodies according to Examples 1 to 6 and Comparative Examples 1 to 4 by the production method described above.

Table 1 shows the thicknesses of the covers and side margins of the unsintered bodies and the concentrations of magnesium (Mg) and manganese (Mn) of the covers and side margins of the unsintered bodies according to Examples 1 to 6 and Comparative Examples 1 to 4, and the dimensions of the oxidized areas of the multi-layer ceramic capacitors according to Examples 1 to 6 and Comparative Examples 1 to 4.

4.2 Evaluation of Multi-Layer Ceramic Capacitor

A capacitance loss rate and a short circuit rate were calculated for the multi-layer ceramic capacitors according to Examples 1 to 6 and Comparative Examples 1 to 4. In this case, multi-layer ceramic capacitors having a capacitance loss rate of 1.5% or less and a short circuit rate less than 10% were determined as approved. Table 2 is a list of those results.

The capacitance loss rate shown in Table 2 is a decreasing rate showing how much extent measured capacitance values of the multi-layer ceramic capacitors according to Examples 1 to 6 and Comparative Examples 1 to 4 decrease as compared with designed capacitance values. The designed capacitance values are values calculated on the basis of the thickness of dielectrics, a dielectric constant, and an intersectional area of the internal electrodes of each capacitor.

Further, the short circuit rate shown in Table 2 indicates the proportion of capacitors having a short circuit failure out of 200 capacitors according to Examples 1 to 6 and Comparative Examples 1 to 4 under the condition where an oscillation level (Osc) is 0.5 V and a voltage with a frequency of 1 kHz is applied. It should be noted that an LCR meter was used to determine whether the capacitor causes a short circuit failure.

TABLE 2

| Sample | Capacitance loss rate [%] | Short circuit rate [%] |
|---|---|---|
| Example 1 | 1.1 | 5 |
| Example 2 | 1.2 | 0 |
| Example 3 | 1.5 | 2 |
| Example 4 | 1.0 | 5 |
| Example 5 | 1.0 | 0 |
| Example 6 | 1.3 | 2 |
| Comparative Example 1 | 0.5 | 10 |
| Comparative Example 2 | 1.8 | 5 |

TABLE 1

| Sample | Thickness of cover [μm] | Thickness of side margin [μm] | Concentration of Mg [mol %] Cover | Concentration of Mg [mol %] Side margin | Concentration of Mn [mol %] Cover | Concentration of Mn [mol %] Side margin | Dimension of oxidized area [μm] Near cover | Dimension of oxidized area [μm] Near center |
|---|---|---|---|---|---|---|---|---|
| Example 1 | 15 | 15 | 0.48 | 0.48 | — | — | 2.5 | 1.5 |
| Example 2 | 15 | 15 | 0.96 | 0.48 | — | — | 4.2 | 1.5 |
| Example 3 | 10 | 10 | 0.48 | 0.48 | — | — | 4 | 2 |
| Example 4 | 15 | 15 | — | — | 0.48 | 0.48 | 2.3 | 1.3 |
| Example 5 | 15 | 15 | — | — | 0.96 | 0.48 | 3.8 | 1.2 |
| Example 6 | 10 | 10 | — | — | 0.48 | 0.48 | 3.6 | 1.7 |
| Comparative Example 1 | 20 | 20 | 0.48 | 0.48 | — | — | 0.7 | 0.7 |
| Comparative Example 2 | 15 | 15 | 0.48 | 0.96 | — | — | 2.5 | 2.5 |
| Comparative Example 3 | 20 | 20 | — | — | 0.48 | 0.48 | 0.5 | 0.5 |
| Comparative Example 4 | 15 | 15 | — | — | 0.48 | 0.96 | 2.2 | 2.2 |

As shown in Table 1, each of the multi-layer ceramic capacitors according to Comparative Examples 1 to 4 has an equal dimension in the oxidized area located near the cover and in the oxidized area located near the center of the capacitance forming unit, whereas each of the multi-layer ceramic capacitors 10 according to Examples 1 to 6 has a larger dimension in the oxidized area located near the cover than a dimension in the oxidized area located near the center of the capacitance forming unit.

TABLE 2-continued

| Sample | Capacitance loss rate [%] | Short circuit rate [%] |
|---|---|---|
| Comparative Example 3 | 0.4 | 10 |
| Comparative Example 4 | 1.6 | 5 |

With reference to Table 2, the multi-layer ceramic capacitors according to Comparative Examples 1 and 3 have the capacitance loss rate of 1.5% or less but have the short circuit rate of 10%. This may be because oxidation of the internal electrodes does not progress due to the thickness of the covers and side margins of the unsintered body, the thickness being larger than 15 μm, and thus the oxidized areas are not sufficiently formed at the ends of the internal electrodes, thus increasing the short circuit rate.

Further, the multi-layer ceramic capacitors according to Comparative Examples 2 and 4 have the short circuit rate less than 10% but have the capacitance loss rate larger than 1.5%. This may be because the side margins have a higher concentration of magnesium (Mg) or manganese (Mn) than the covers, and thus the ends of the internal electrodes that are adjacent to the side margins are excessively oxidized, thus increasing the capacitance loss rate.

Meanwhile, the multi-layer ceramic capacitors 10 according to Examples 1 to 6 each have the capacitance loss rate of 1.5% or less and the short circuit rate less than 10%. As a result, it was confirmed that the multi-layer ceramic capacitors 10 according to Examples 1 to 6 satisfy both of the suppression of a short circuit failure and the ensuring of a capacitance.

From the above, it was experimentally confirmed that each of the multi-layer ceramic capacitors 10 according to this embodiment, which are produced by the production method described above, has a configuration capable of satisfying both of the suppression of a short circuit failure and the ensuring of a capacitance.

5. Other Embodiments

While the embodiment of the present invention has been described, the present invention is not limited to the embodiment described above, and it should be appreciated that the present invention may be variously modified.

For example, in the multi-layer ceramic capacitor 10, the capacitance forming unit 18 may be divided into capacitance forming units in the Z-axis direction. In this case, in each capacitance forming unit 18, the first internal electrodes 12 and the second internal electrodes 13 only need to be alternately disposed along the Z-axis direction. In a portion where the capacitance forming units 18 are next to each other, the first internal electrodes 12 or the second internal electrodes 13 may be continuously disposed.

What is claimed is:

1. A method of producing a multi-layer ceramic capacitor, comprising:
   producing an unsintered multi-layer chip including
      a capacitance forming unit including
         ceramic layers laminated in a first direction, and
         internal electrodes disposed between the ceramic layers and mainly containing nickel,
      a cover that covers the capacitance forming unit from the first direction, wherein the cover is adjacent in the first direction to an outermost layer of the internal electrodes, and
      a side surface that is oriented in a second direction orthogonal to the first direction, the internal electrodes being exposed to the side surface;
   producing an unsintered body by covering the side surface from the second direction by a side margin, the side margin containing a metal element that be capable to form an oxide together with nickel, the metal element having a concentration lower than a concentration of a metal element of the cover; and
   sintering the unsintered body,
   wherein the metal element includes manganese.

2. The method of producing a multi-layer ceramic capacitor according to claim 1, wherein the cover has a thickness of 15 μm or less in the first direction, and
   the side margin has a thickness of 15 μm or less in the second direction.

3. The method of producing a multi-layer ceramic capacitor according to claim 1, wherein
   the unsintered body is sintered to from an oxidized area in each of the internal electrodes, the oxidized area being adjacent to the side margin and intensively including the metal element,
   the capacitance forming unit includes a first portion adjacent to the cover in the first direction, and the capacitance forming unit further includes a second portion adjacent to the first portion in the first direction, and
   the first portion of the capacitance forming unit includes the oxidized area having a larger dimension, measured in the second direction, than a dimension of the oxidized area of the second portion of the capacitance forming unit, measured in the second direction.

4. The method of producing a multi-layer ceramic capacitor according to claim 1, wherein the metal element includes magnesium.

5. The method of producing a multi-layer ceramic capacitor according to claim 3, wherein the metal element includes magnesium.

6. The method of producing a multi-layer ceramic capacitor according to claim 2, wherein
   the unsintered body is sintered to from an oxidized area in each of the internal electrodes, the oxidized area being adjacent to the side margin and intensively including the metal element,
   the capacitance forming unit includes a first portion adjacent to the cover in the first direction, and the capacitance forming unit further includes a second portion adjacent to the first portion in the first direction, and
   the first portion of the capacitance forming unit includes the oxidized area having a larger dimension, measured in the second direction, than a dimension of the oxidized area of the second portion of the capacitance forming unit, measured in the second direction.

7. The method of producing a multi-layer ceramic capacitor according to claim 6, wherein the metal element includes magnesium.

* * * * *